April 7, 1959  A. G. VAN ALSTYNE  2,881,356
POSITION INDICATION METHOD AND SYSTEM
Filed July 14, 1955  4 Sheets-Sheet 3

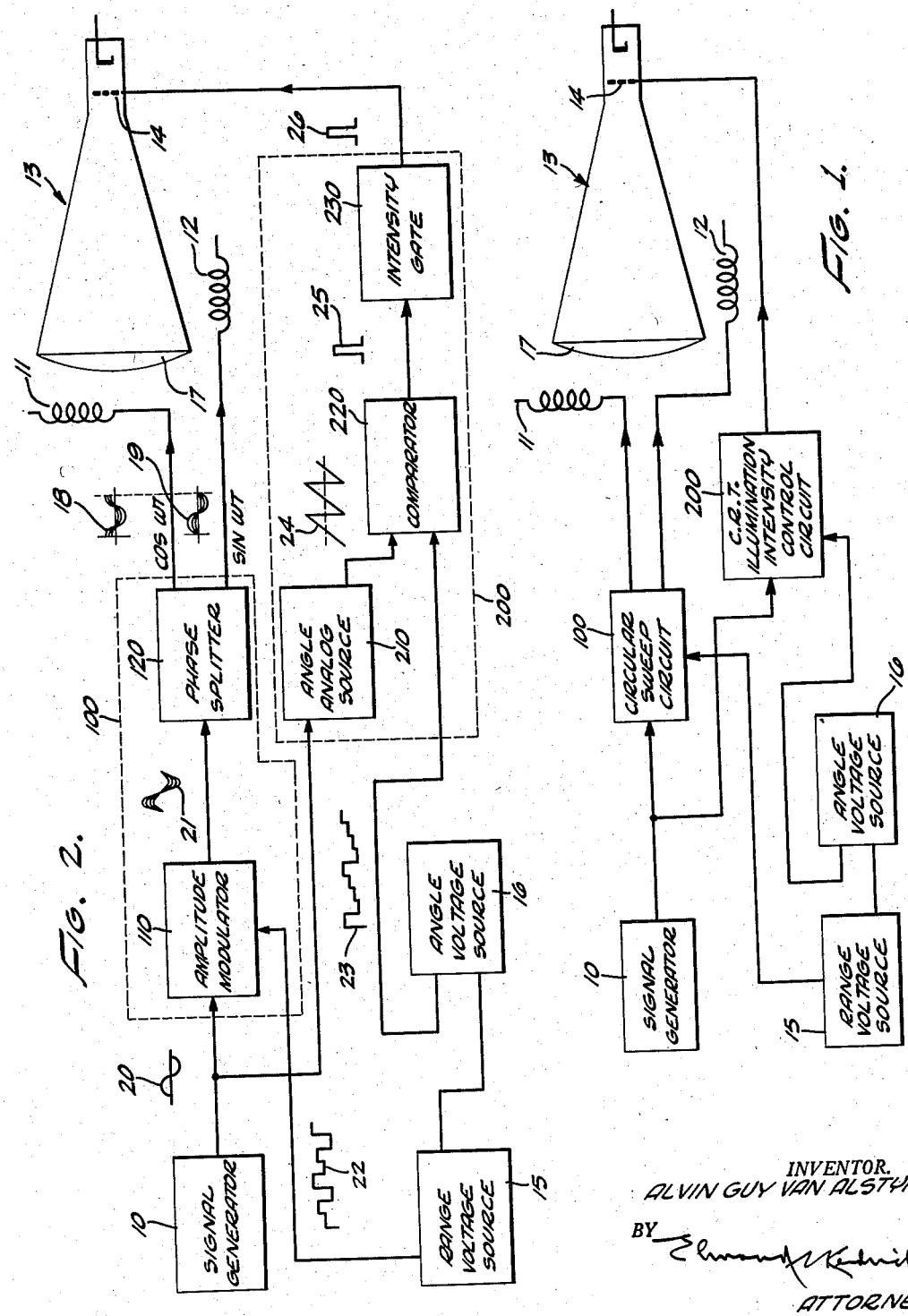

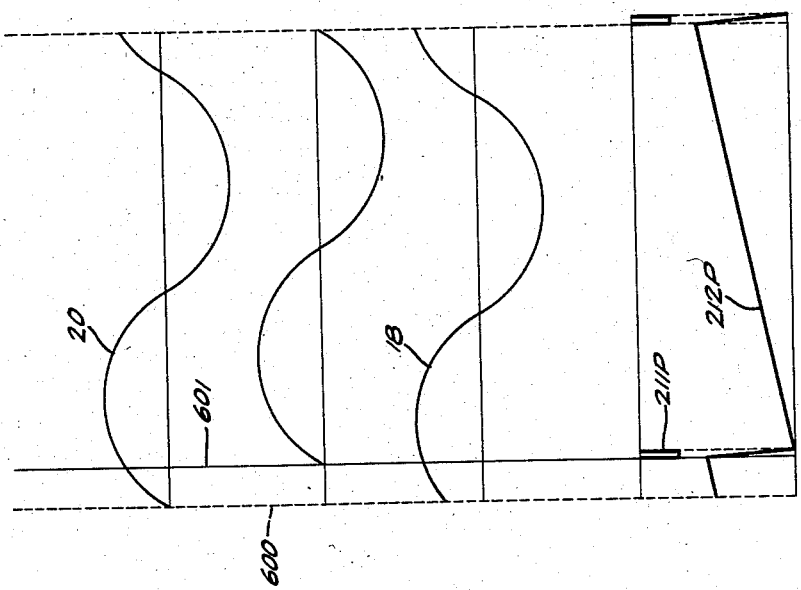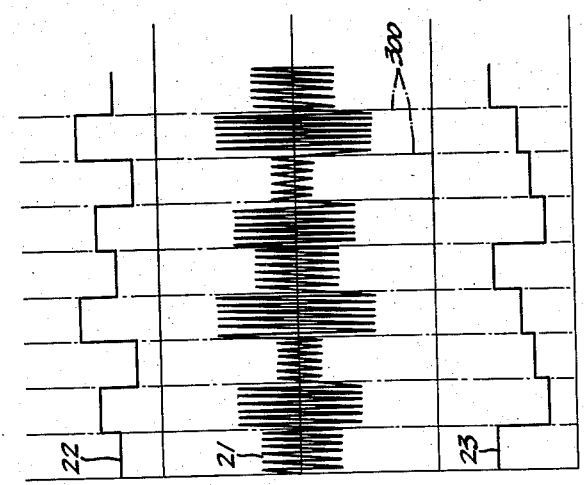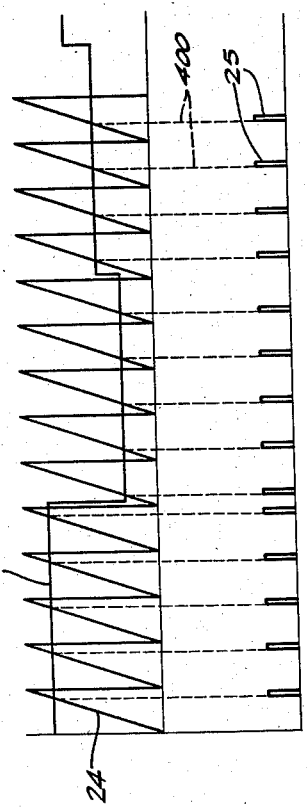

INVENTOR.
ALVIN GUY VAN ALSTYNE
BY
ATTORNEY

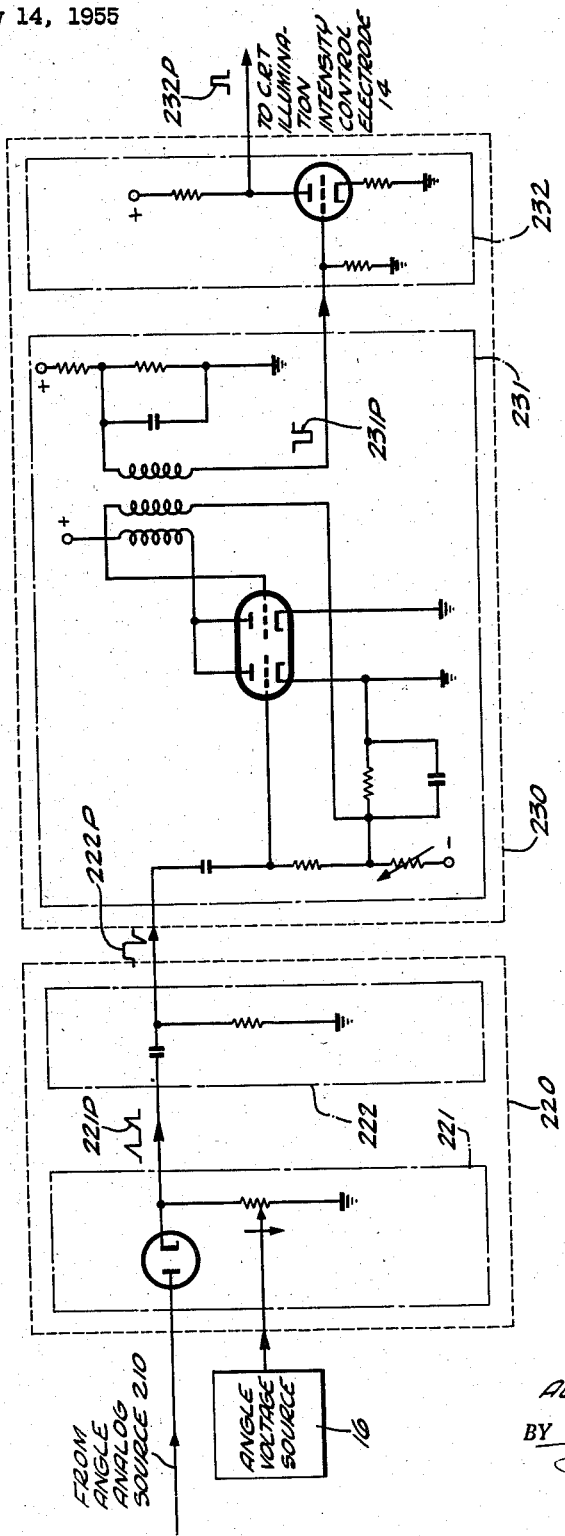

2,881,356
Patented Apr. 7, 1959

United States Patent Office

2,881,356
POSITION INDICATION METHOD AND SYSTEM

Alvin Guy Van Alstyne, Los Angeles, Calif., assignor to Gilfillan Bros., Inc., Los Angeles, Calif., a corporation of California Application July 14, 1955, Serial No. 521,981

12 Claims. (Cl. 315—22)

This invention relates to cathode-ray tube indicators and more particularly, to a method and system for directly producing a bi-dimensional representation of the position of one or more objects or points in a predetermined plane from given range and angle information.

It is frequently desirable to display the position of several objects on the same indicator simultaneously, such as by using several light spots on the luminescent screen of a cathode-ray tube type of indicator. In order to avoid the burdensome requirements of having to generate a range versus time base for each object and having to synchronize these time bases, it is desirable to provide an indication system, independent of a range versus time base.

In many position indication systems no reason exists at all which would require the generation of a range versus time base, except for the fact that such a time base is normally needed to produce a satisfactory representation of an object position. Where only object range and angle information are available and a range versus time base generator is not otherwise normally provided, it is undesirable to employ additional equipment to generate this range function of time because of the high cost and large quantity of equipment that is generally needed to provide such a time base.

The device of the present invention overcomes the above-described disadvantages of the prior art by periodically positioning a cathode-ray tube electron beam at a radius proportional to the range of an object and by turning the beam on at an instant, in time proportional to the angular position of the object. Only a small number of inexpensive component parts are required to practice the present invention. In addition, the position of an object may be visually displayed without generating a range versus time base. The device of the present invention is thus particularly useful in displaying the positions of several objects simultaneously without first generating range versus time bases for each of the objects and then synchronizing those time bases.

The method of the present invention comprises directing a beam of a cathode-ray tube type of indicator in a circle having a radius proportional to the range of an object. The beam is then operated or turned on when the beam is in an angular position corresponding to the angular position of the object. The position of any number of objects may thus be easily simultaneously displayed.

In accordance with the invention a circular sweep circuit is connected between a range voltage source and the deflection means of a cathode-ray tube for circularly sweeping the beam of the tube over one end of the tube with a radius equal to the output signal amplitude of the range voltage source. Means are then additionally provided for impressing a voltage pulse upon an illumination intensity control electrode of the cathode-ray tube at a selected time during the sweep cycle of the sweep circuit to cause the beam to strike a luminescent or storage target within the tube to indicate graphically the position of a point in a plane. Other circuitry is thus not needed to generate and synchronize a plurality of range-time functions.

It is therefore an object of the invention to provide an improved position indication system.

It is another object of the invention to provide an improved method of producing a bi-dimensional representation of the position of a point in a predetermined plane.

It is a further object of the invention to provide a bi-dimensional position indication system which may obviate the necessity of generating a range versus time base.

It is still another object of the invention to provide a cathode-ray tube bi-dimensional position indication system requiring a relatively small number of inexpensive components.

Other objects and advantages of the present invention will be better understood when considered with the following description taken in connection with the accompanying drawings made a part of this specification wherein several embodiments are illustrated by way of example. The device of the present invention is by no means limited to the specific embodiments illustrated in the drawings since they are shown merely for purposes of description.

Figs. 1 and 2 are block diagrams of two embodiments of the position indication system of the present invention;

Fig. 3 is a graph of a group of wave forms characteristic of the operation of the invention shown in Fig. 2;

Fig. 4 is a graph of a group of wave forms characteristic of the operation of certain of the component parts of the invention shown in Fig. 2;

Figure 5A:
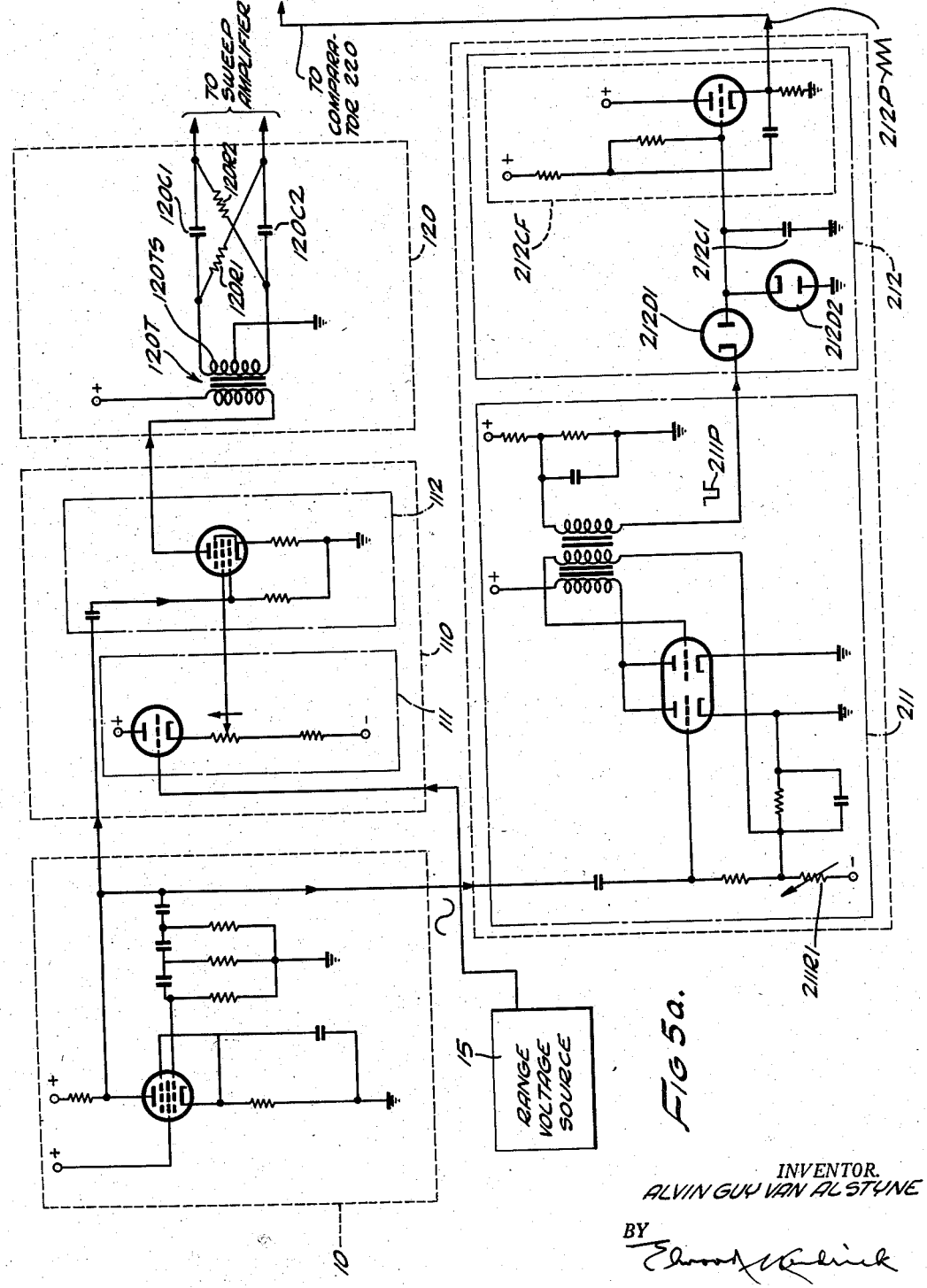

Figs. 5(a) and 5(b) are schematic diagrams of the embodiment of the invention shown in Fig. 2; and Fig. 6 is a graph of a group of wave forms characteristic of the operation of some of the components of the position indication system of the present invention shown in Fig. 6.

In Fig. 1 of the drawings a signal generator 10 is shown connected to a circular sweep circular 100 which is, in turn, connected to two deflection coils 11 and 12 of a cathode-ray tube 13. A C.R.T. intensity control circuit 200 is likewise connected for signal generator 10. The output signal of the control circuit 200 is then coupled to an illumination intensity control electrode 14 of the tube 13.

In the operation of the circuit of Fig. 1, circular sweep circuit 100 sweeps the beam of tube 13 in a circular fashion at a radius proportional to the output signal amplitude of a range voltage source 15 there shown. The beam is then pulsed on at a particular time during each cycle of operation of signal generator 10 proportional to the output signal amplitude of an angle voltage source 16. A spot of light is thus produced on a luminescent screen 17 of the tube 13 to indicate the position of a point having a range and angular position corresponding respectively to the output signal amplitudes of range voltage source 15 and angle voltage source 16.

In Fig. 2 of the drawings signal generator 10 is shown connected to circular sweep circuit 100 which includes an amplitude modulator 110. Modulator 110 is, in turn, connected to a phase splitter 120. Range voltage source 15 is connected to angle voltage source 16 and to amplitude modulator 110 for modulating the amplitude of the output signal of signal generator 10.

An angle analog source 210 is included in control circuit 200 to provide, for example, a sawtooth output voltage for each cycle of the output signal of signal generator 10. Angle analog source 210 is connected from signal generator 10 to a comparator 220. Comparator 220 is connected to angle voltage source 16 for producing an output voltage pulse at a time when the amplitude of the output signal of angle voltage source 16 is equal to the amplitude of the output signal of angle analog source 210. The output pulse of comparator 220 is then employed to operate an intensity gate 230 to which it is connected in order that the beam of cathode-ray tube 13, shown in Fig. 2, may be turned on to illuminate a spot on the screen 17 of the tube 13. Accordingly intensity gate 230 is connected to the illumination intensity control electrode 14 of tube 13.

The two deflection coils 11 and 12 are disposed 90 mechanical degrees about the tube 13 whereby the beam of the tube may be swept in a circular manner when sinusoidal voltages are impressed upon the deflection coils 11 and 12. Sinusoidal voltages 90 electrical degrees out of phase with each other are, in fact, impressed upon coils 32 and 34. These voltages are provided by phase splitter 120 which produces two output voltages from the output signals 18 and 19 of amplitude modulator 110 which respectively lead and lag the input signal of phase splitter 120 by 45 degrees.

Alternatively, phase splitter 120 may be connected directly from signal generator 10. Two modulators would then be connected from range voltage source 15 and the pulse splitter 120 to the respective deflection coils 11 and 12 of cathode-ray tube 13. It is obvious that a single phase shifter may be substituted for the phase splitter 120 to provide an output signal 90 electrical degrees out of phase with respect to the output signal of signal generator 10.

In the operation of the position indication system of Fig. 2 carrier generator 10 generates a sine wave as indicated by wave form 20. The sine wave 20 is then amplitude modulated by amplitude modulator 110 according to the output signal amplitude of the range voltage source 15. The output of amplitude modulator 12 is thus indicated by sine wave forms 21 of varying amplitudes.

The output signals of amplitude modulator 110 are then fed to phase splitter 120 which provides output signals $r \sin \omega t$ and $r \cos \omega t$ which are 90 electrical degrees out of phase. When the beam of the tube 13 is turned on it is swept in a circular manner about the screen 17 with a radius corresponding to the amplitude of the output signal of range voltage source 15. By virtue of the fact that comparator 220 only produces a pulse when the output signal of angle voltage source 16 is equal to the amplitude of the output signal of angle analog source 210, the screen 17 is only illuminated at a point on its circular path during one sweep cycle of the sweep circuit indicated by one cycle of the output signal generator 10. This spot then indicates the position of a point in a plane having a range, e.g., $R_1$, $R_2$, $R_3$ or $R_n$ depending on the range and angle information sampled as indicated at 22.

The position indication system of the present invention can be employed to indicate the position of a number of objects and their bearing without the need for a range versus time sweep generator since their position information may be periodically sampled and instantaneously displayed.

During the operation of the position indication system of Fig. 2, angle analog source 210 provides a sawtooth voltage output increasing over one cycle of operation of signal generator 10. Comparator 220 then produces a pulse output at a time during the sweep cycle of signal generator 10 when the bearing angle of a certain object corresponds to the angular deflection of the cathode-ray tube beam.

The operation of the position indication system of Fig. 2 will be better understood by reference to the wave forms of Fig. 3 comprising sampled range voltages of different objects where the output voltage 22 of range voltage source 15 is indicated as a function of time $t$. The output voltage 21 of amplitude modulator 110 is also indicated as a function of time in Fig. 3 as is an output voltage 23 of angle voltage source 16. The dashed lines 300 in Fig. 3 indicate the correspondence in time of each of the signals 21, 22 and 23. Range voltage source 15 thus modulates the amplitude of 20 in accordance with the amplitude 22 at any given time.

When the voltage 23 is equal to the amplitude of the output signal of angle analog source 210 then comparator 220 produces an output pulse 25. Intensity gate pulses the illumination intensity control electrode 14 of cathode-ray tube 13 with a pulse 26 to illuminate a spot on the screen 17 of cathode-ray tube 13. All the time during which the beam of the tube is pulsed on the beam is swept in a circular manner with a radius proportional to the range of the object displayed.

In Fig. 4 the output voltage 23 of angle voltage source 16 is shown with an expanded time axis and in addition the sawtooth voltage 24 existing at the output side of angle analog source 210 is shown on the same graph. Thus at the dash lines 400 where 23 equals 24 a pulse output 25 is impressed upon intensity gate 230 from comparator 220.

The component parts of the position indication system of the present invention shown in Fig. 2 are shown in a schematic diagram in Figs. 5(a) and 5(b) including signal generator 10 in Fig. 5(a) which comprises a phase shift oscillator. Connected to signal generator 10 is amplitude modulator 110 which includes a cathode follower input stage 111 which is connected to range voltage source 15 and a pentode modulator 112. The modulator 110 is transformer coupled to phase splitter 120 which comprises a transformer 120T, two capacitors 120C1 and 120C2 that are serially connected with the secondary winding 120TS of the transformer 120T and two resistors 120R1 and 120R2 which are connected to opposite corresponding sides of each of the capacitors 120C1 and 120C2.

The phase splitter 120 is well known in the art. When output signals 90 degrees out of phase with each other are intended to be produced which are disposed 45 electrical degrees from the input signal, then the resistance R, of each of the resistors 120R1 and 120R2 must be equal to the impedance of each of the capacitors 120C1 and 120C2, i.e., when C is the capacitance of each of the capacitors 120C1 and 120C2, the following relationship must be maintained $$R = \frac{1}{\omega C}$$

where $\omega = 2\pi f$ and $f$ is the operating frequency of the phase splitter 120. In the normal case it will be desirable to employ triode sweep amplifiers between the phase splitter 120 and the deflection coils 11 and 12 of the cathode-ray tube 13 in Fig. 2.

Angle analog source 210 is shown connected from signal generator 10 in Fig. 5(a) and includes a driven blocking oscillator 211 which operates to give a negative pulse at an appropriate interval during one cycle of operation of the signal generator 10. The output negative pulse is indicated by 211P in Fig. 5(a). Blocking oscillator 211 is biased negatively by an adjustable resistor 211R1. When the output signal amplitude of signal generator 10 reaches a predetermined value the blocking oscillator 211 will then fire to give the negative output pulse 211P. The negative output pulse 211P is then impressed upon a driven sawtooth generator 212 which comprises a serially connected diode rectifier 212D1, the cathode of which is connected to the blocking oscillator 211. A rectifier 212D2 is also incorporated in sawtooth generator 212 which has its cathode connected from the place of rectifier 212D1 to ground. A capacitor 212C1 is then connected from the cathode of rectifier 212D2 to ground. When the blocking oscillator 211 produces a negative output pulse 211P the voltage across the capacitor 212C1 is reduced to ground. The capacitor 212C1 is prevented from charging below ground by the rectifier 212D2. The capacitor 212C1 is connected to a cathode follower stage 212CF which makes the discharge of capacitor 212C1 relatively linear, whereby the output voltage taken from the cathode of the triode incorporated in the cathode follower stage 212CF is a sawtooth voltage having a periodicity corresponding to one-half the frequency of the output signal of signal generator 10. Blocking oscillator 211 is employed to initiate this sawtooth voltage provided by sawtooth voltage generator 212 at any particular time during the rise of the output signal amplitude of the signal generator 10.

For clarity of explanation the resistor 211R1 in the blocking oscillator 211 may be considered to be adjusted to a value to cause blocking oscillator 211 to fire at a time 45 electrical degrees from the time at which the output signal amplitude of signal generator 10 starts to rise. In such a case the sawtooth generator 14 will provide a sawtooth voltage corresponding to the lagging signal of the two output signals 18 and 19 of phase splitter 120, i.e., the signal 19 defined by the term $r \sin \omega t$.

Comparator 220 is connected from angle analog source 210 and is shown in Fig. 5(b) comprising a diode pickoff 221 and a differentiator 222. Angle voltage source 16 and angle analog source 210 are then connected to diode pickoff 221 to provide an output voltage corresponding to the negative limited sawtooth wave from 221P shown in Fig. 5(b). Differentiator 222 differentiates the wave form 221P to give an output voltage proportional to the wave form 222P as shown in Fig. 5(b). The wave form 222P is impressed upon intensity gate 230 which comprises another blocking oscillator 231 which may be substantially the same as blocking oscillator 211. Blocking oscillator 231 then provides a relatively short negative output pulse 231P, which must be inverted. This is accomplished by an inverter amplifier 232 to give a positive pulse 232P which is impressed upon the current control electrode 14 of the cathode-ray tube 13 to illuminate a spot on the screen 17 of the tube 13 to indicate the position of an object.

The exact operation of the components of the position indication system of the present invention shown in Fig. 5 will be better understood with reference to the graph of curves in Fig. 6 characteristic of the operation of the invention. Voltages 20, 19 and 18 are shown in Fig. 6 with an expanded time base. Voltage pulse 231P is again employed to indicate the output voltage of blocking oscillator 211. A wave form 212P is employed to indicate the output voltage of sawtooth generator 212. The distance between the dashed and solid lines 600 and 601 shown in Fig. 6 is employed to indicate the displacement of signals by 45 electrical degrees. It is to be noted that 19 lags voltage 20 by 45 electrical degrees and that 18 leads voltage 20 by 45 electrical degrees. The voltage 19 is employed to indicate an arbitrarily selected origin. If the blocking oscillator 211 is properly adjusted to fire at 45 electrical degrees, then 211P is the proper indication of the firing output voltage pulse of blocking oscillator 211. When blocking oscillator 211 fires, then the capacitor 212C1 in sawtooth generator 212 will discharge and as the voltage across capacitor 212C1 increases, the output voltage 212P of the sawtooth generator 212 may increase substantially linearly over one cycle of oscillation of 20.

By use of the present invention a plurality of object positions may thus be displayed simultaneously on the same indicator without the generation of range versus time basis. The position indication system accordingly may be made with a few simple well known components.

What is claimed is:

1. In a cathode-ray tube bi-dimensional position indication system including range and angle voltage sources and a cathode-ray tube having deflection means and an illumination intensity control electrode, the combination comprising a circular sweep circuit connected between the range voltage source and the deflection means of the cathode-ray tube for circularly sweeping the beam of the cathode-ray tube over one end of the tube at a radius proportional to the output signal amplitude of the range voltage source, and means for impressing a voltage pulse on the illumination intensity control electrode of the tube at a time during the sweep cycle of said circular sweep circuit proportional to the output signal amplitude of the angle voltage source.

2. A cathode-ray tube bi-dimensional position indication system comprising range and angle voltage sources, a cathode-ray tube having deflection means and an illumination intensity control electrode, a circular sweep circuit connected between said range voltage source and said deflection means of said cathode-ray tube for circularly sweeping the beam of said tube over one end of the tube at a radius proportional to the output signal amplitude of said range voltage source and means for impressing a voltage pulse on said illumination intensity control electrode of said tube at a time during the sweep cycle of said circular sweep circuit proportional to the output signal amplitude of said angle voltage source.

3. In a cathode-ray tube bi-dimensional position indication system including range and angle voltage sources and a cathode-ray tube having deflection means and an illumination intensity control electrode, the combination comprising an alternating-current signal generator, first means for modulating the amplitude of the output signal of said signal generator in accordance with the output signal amplitude of the range voltage source, second means for producing two alternating voltages 90 electrical degrees out of phase with each other and amplitude modulated by said range voltage source, said voltages being impressed upon the deflection means of the cathode-ray tube, third means connected to said signal generator for developing a reference voltage proportional to the phase of the output voltage of said signal generator during any selected sweep cycle, a comparator, said third means being connected to said comparator, an intensity gate connected between said comparator and the illumination intensity control electrode of the cathode-ray tube, said comparator impressing a pulse upon said intensity gate at a time when the output signal amplitude of the angle voltage source is equal to the output voltage of said third means.

4. A cathode-ray tube bi-dimensional position indication system comprising range and angle voltage sources, a cathode-ray tube having deflection means and an illumination intensity control electrode, an alternating voltage signal generator, first means for modulating the amplitude of the output signal of said signal generator with the output voltage of said range voltage source, second means for producing two alternating voltages 90 electrical degrees out of phase with each other from the output signal of said signal generator, said modulated alternating voltages being impressed upon said deflection means of said cathode-ray tube, third means connected to said signal generator for developing a saw-tooth voltage proportional in magnitude to the phase of the output voltage of said signal generator during at least one cycle, a comparator, said third means being connected to said comparator, an intensity gate connected between said comparator and said illumination intensity control electrode of said cathode-ray tube, said comparator impressing a pulse upon said intensity gate at a time when the output voltage of said angle voltage source is equal to the output voltage of said third means.

5. A cathode-ray tube bi-dimensional position indication system comprising range and angle voltage sources, a cathode-ray tube having deflection means and an illumination intensity control electrode, said deflection means being divided into first and second portions disposed 90 mechanical degrees about said tube, an alternating-current signal generator, an amplitude modulator, said range voltage source and said signal generator being connected to said modulator whereby said range voltage source may modulate the amplitude of the output voltage of said signal generator, a phase splitter for providing two output voltages 90 electrical degrees apart connected from said modulator to said deflection means of said cathode-ray tube to provide a circular sweep circuit for said tube, said phase splitter having two output leads connected, respectively, to said first and second portions of said deflection means, first means for producing a voltage proportional to the phase of the output voltage of said signal generator connected from said signal generator, a pick-off, an intensity gate connected between said pick-off and said illumination intensity control electrode of said cathode-ray tube, said angle voltage source and said means for producing a voltage proportional to the phase of the output voltage of said signal generator being connected to said pick-off and a differentiator responsive to the output signal of said pick-off for impressing a voltage pulse upon said intensity gate to operate said intensity gate at a time when the output voltages of said angle voltage source and said first means are equal.

6. In a cathode-ray tube bi-dimensional position indication system including range and angle voltage sources and a cathode-ray tube having deflection means and an illumination intensity control electrode, the combination comprising an alternating current signal generator, an amplitude modulator, said range voltage source and said signal generator being connected to said modulator whereby said range voltage source may modulate the amplitude of the output voltage of said signal generator, a phase splitter for providing two output voltages 90 electrical degrees apart, said phase splitter being connected from said modulator to said deflection means of said cathode-ray tube to provide a circular sweep circuit for said tube, first means for producing a voltage proportional to the phase of the output voltage of said signal generator connected from said signal generator, a pick-off, an intensity gate connected between said pick-off and said illumination intensity control electrode of said cathode ray tube, said angle voltage source and said first means being connected to said pick-off and a differentiator responsive to the output signal of said pick-off for impressing a voltage pulse upon said intensity gate to operate said intensity gate at a time when the output voltages of said angle voltage source and said first means are equal.

7. In a cathode-ray tube bi-dimensional position indication system including range and angle voltage sources and a cathode-ray tube having deflection means and an illumination intensity control electrode, the combination comprising an alternating voltage signal generator, first means responsive to said alternating voltage for impressing sweep voltages on the deflection means of the cathode-ray tube to sweep the cathode-ray thereof circularly over the face of the tube, second means for modulating the amplitudes of said sweep voltages in proportion to the output signal amplitude of said range voltage source, third means responsive to the output voltage of said signal generator for producing a voltage proportional to the phase of the output voltage of said signal generator, and fourth means for impressing an intensity gate on said illumination intensity control electrode at a time when the output signal amplitude of said angle voltage source is equal to the output signal amplitude of said third means.

8. A cathode-ray tube bi-dimensional position indication system comprising range and angle voltage sources, a cathode-ray tube having deflection means and an illumination intensity control electrode, an alternating voltage signal generator, first means responsive to said alternating voltage for impressing sweep voltages on the deflection means of the cathode-ray tube to sweep the cathode ray thereof circularly over the face of the tube, second means for modulating the amplitudes of said sweep voltages in proportion to the output signal amplitude of said range voltage source, third means responsive to the output voltage of said signal generator for producing a voltage proportional to the phase of the output voltage of said signal generator, and fourth means for impressing an intensity gate on said illumination intensity control electrode at a time when the output signal amplitude of said angle voltage source is equal to the output signal amplitude of said third means.

9. In a cathode-ray tube, the method of producing a bi-dimensional representation of the position of a point in a polar coordinate system having a polar reference angle and an origin, said method comprising the steps of: producing a first signal proportional to the distance of said point from said origin, producing a second signal proportional to the polar angle coordinate of said point, sweeping the cathode ray of said tube circularly over one end of said tube at a radial distance from said origin proportional to said signal, producing a third signal proportional to the angular position of said cathode ray with respect to said reference angle, and pulsing the cathode ray on at a time when said second and third signals are equal.

10. An indication system for displaying the range and azimuth of a plurality of radar targets on a time shared basis, said system comprising: a range voltage source for producing a plurality of range voltages successively corresponding to the ranges of different radar targets; an angle voltage source for producing a plurality of angle voltages successively and synchronously with range voltage source corresponding to the azimuth of said radar targets, an angle voltage corresponding to a particular radar target being produced at the same time that a range voltage corresponding to the same radar target is produced; a cathode-ray tube having first and second deflection means disposed at a predetermined number of mechanical degrees around its axis, said cathode-ray tube having an electron gun for producing electron stream and a display target spaced from said gun to intercept said stream; means to produce two sine wave voltages each having the same predetermined period, said sine wave voltages having an amplitude proportional to the output of said range voltage source and a phase difference equal in electrical degrees to said predetermined number of mechanical degrees; means to apply one of said sine wave voltages to said first deflection means; means to apply the other of said sine wave voltages to said second deflection means; means to produce a sawtooth voltage synchronously with said sine wave voltages having a period equal to said predetermined period; and means for gating said electron stream on to impinge on said target only for a length of time short in comparison to said predetermined period and at a time when said sawtooth voltage is equal to the output voltage of said angle voltage source.

11. An indication system for displaying the range and azimuth of a plurality of radar targets on a time shared basis, said system comprising: a range voltage source for producing a plurality of range voltages successively corresponding to the ranges of different radar targets; an angle voltage source for producing a plurality of angle voltages successively and synchronously with range voltage source corresponding to the azimuth of said radar targets, an angle voltage corresponding to a particular radar target being produced at the same time that a range voltage corresponding to the same radar target is produced; a cathode-ray tube having first and second deflection means disposed at a predetermined number of mechanical degrees around its axis, said cathode-ray tube having an electron gun for producing electron stream and a display target spaced from said gun to intercept said stream; means to produce two sine wave voltages each having the same predetermined period, said sine wave voltages having an amplitude proportional to the output of said range voltage source and a phase difference equal in electrical degrees to said predetermined number of mechanical degrees; means to apply one of said sine wave voltages to said first deflection means;

means to apply the other of said sine wave voltages to said second deflection means; means to produce a sawtooth voltage synchronously with said sine wave voltages; and means for gating said electron stream on to impinge on said target only for a length of time short in comparison to said predetermined period and at a time when said sawtooth voltage is equal to the output voltage of said angle voltage of said angle voltage source; said predetermined period being small in comparison to the period over which range and angle voltages are produced by said range and angle voltage sources respectively for a single radar target.

12. An indication system for displaying the range and azimuth of a plurality of radar targets on a time shared basis, said system comprising: a range voltage source for producing a plurality of range voltages successively corresponding to the range of different radar targets; an angle voltage source for producing a plurality of angle voltages successively and synchronously with range voltage source corresponding to a particular radar target being produced at the same time that a range voltage corresponding to the same radar target is produced; a cathode-ray tube having horizontal and vertical deflection means, an electron gun for producing an electron stream, and a display target to intercept said electron stream; means to produce two sine wave voltages each having a predetermined period, said sine wave voltages both having an amplitude proportional to the output voltage of said range voltage source, one of said sine wave voltages having a phase different from the other by ninety electrical degrees; means to apply one of said sine wave voltages to said first deflection means; means to apply the other of said sine wave voltages to said second deflection means; means to produce a sawtooth voltage synchronously with said sine wave voltages having a period equal to said predetermined period; and means for gating said electron stream on to impinge on said target only for a length of time short in comparison to said predetermined period and at a time when said sawtooth voltage is equal to the output voltage of said angle voltage source.

References Cited in the file of this patent
UNITED STATES PATENTS

| | | |
|---|---|---|
| 2,407,475 | Charrier | Sept. 10, 1946 |
| 2,409,456 | Tolson | Oct. 15, 1946 |
| 2,422,697 | Meacham | June 24, 1947 |
| 2,426,439 | Dome | Aug. 26, 1947 |
| 2,444,193 | Gillette | June 29, 1949 |
| 2,509,207 | Busignies | May 30, 1950 |
| 2,566,332 | Huber et al. | Sept. 4, 1951 |
| 2,737,653 | Shreve et al. | Mar. 6, 1956 |